US011585557B2

(12) United States Patent
Tackabury et al.

(10) Patent No.: US 11,585,557 B2
(45) Date of Patent: Feb. 21, 2023

(54) ANOMALY DETECTION BASED ON AIRFLOW ALERTERS

(71) Applicant: International Business Machines Corporation, Armonk, NY (US)

(72) Inventors: Wayne Francis Tackabury, West Tisbury, MA (US); Cesar Augusto Rodriguez Bravo, Alajuela (CR); Doga Tav, Fredericton (CA)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 16/918,677

(22) Filed: Jul. 1, 2020

(65) Prior Publication Data

US 2022/0003449 A1 Jan. 6, 2022

(51) Int. Cl.

*G06F 21/55* (2013.01)
*F24F 11/64* (2018.01)

(Continued)

(52) U.S. Cl.

CPC .............. *F24F 11/64* (2018.01); *F24F 11/32* (2018.01); *F24F 11/52* (2018.01); *G06F 21/552* (2013.01);

(Continued)

(58) Field of Classification Search

CPC ....... G06F 21/552; G06F 21/55; G08B 13/20; F24F 2110/30

See application file for complete search history.

(56) References Cited

U.S. PATENT DOCUMENTS 3,357,250 A 12/1967 Lowdermilk
5,653,239 A 8/1997 Pompei et al.

(Continued)

FOREIGN PATENT DOCUMENTS

CN 205050281 U 10/2015
DE 10244730 A1 4/2004

(Continued)

OTHER PUBLICATIONS

Jul. 1, 2020, U.S. Appl. No. 16/918,655, 20220003442.

(Continued)

*Primary Examiner* — Benyam Haile
(74) *Attorney, Agent, or Firm* — Troutman Pepper Hamilton Sanders LLP

(57) ABSTRACT

A computer-implemented method for anomaly detection in a data processing system comprising a processor and a memory comprising instructions which are executed by the processor. The method includes receiving a plurality of real-time airflow patterns acquired by a plurality of airflow alerters, wherein each real-time airflow pattern corresponds to a different airflow alerter; comparing each real-time airflow pattern with a predetermined airflow pattern, wherein each real-time airflow pattern corresponds to a different predetermined airflow pattern; when there is any real-time airflow pattern different from the corresponding predetermined airflow pattern, identifying a group of airflow alerters among the plurality of airflow alerters, wherein a real-time airflow pattern of each airflow alerter in the group is different from the corresponding predetermined airflow pattern; and identifying a location of an anomaly based on the group of airflow alerters.

20 Claims, 8 Drawing Sheets

(51) Int. Cl.

| | |
|---|---|
| ***F24F 11/52*** | (2018.01) |
| ***G08B 13/20*** | (2006.01) |
| ***F24F 11/32*** | (2018.01) |
| *F24F 110/30* | (2018.01) |

(52) U.S. Cl.

CPC .......... *G08B 13/20* (2013.01); *F24F 2110/30* (2018.01); *G06F 2221/034* (2013.01)

(56) References Cited

U.S. PATENT DOCUMENTS

| | | | | |
|---|---|---|---|---|
| 8,090,817 | B2 | 1/2012 | Fowler et al. | |
| 8,892,495 | B2 | 11/2014 | Hoffberg et al. | |
| 8,938,367 | B2 * | 1/2015 | Patel | F24F 11/46 702/50 |
| 9,618,222 | B1 * | 4/2017 | Hussain | G05B 19/048 |
| 9,983,038 | B2 | 5/2018 | Kamiya | |
| 10,062,254 | B1 | 8/2018 | Paul | |
| 10,506,411 | B1 | 12/2019 | Jacob | |
| 2005/0211415 | A1 | 9/2005 | Arts et al. | |
| 2010/0271394 | A1 | 10/2010 | Howard | |
| 2014/0375453 | A1 | 12/2014 | Chamoux | |
| 2015/0127712 | A1 | 5/2015 | Fadell et al. | |
| 2015/0356839 | A1 | 12/2015 | Na | |
| 2016/0097555 | A1 | 4/2016 | Lyons et al. | |
| 2017/0331322 | A1 | 11/2017 | Tuerk et al. | |
| 2019/0088098 | A1 | 3/2019 | Gangumalla et al. | |
| 2021/0033301 | A1 * | 2/2021 | Boody | F24F 11/745 |

FOREIGN PATENT DOCUMENTS

| | | | |
|---|---|---|---|
| EP | 0991926 | B1 | 12/2005 |
| GB | 2528142 | A | 5/2014 |
| GB | 2554153 | A | 3/2018 |
| JP | 2004334484 | A | 5/2003 |
| JP | 4157914 | B2 | 10/2008 |
| KR | 101829725 | B1 | 2/2018 |

OTHER PUBLICATIONS

"Intrusion Detection Systems and Subsystems," Technical Information for NRC Licensees, United States Nuclear Regulatory Commission, Mar. 2011.

Langston, J., "In first, 3-D printed objects connect to WiFi without electronics," UW News, Dec. 5, 2017 (https://www.washington.edu/news/2017/12/05/in-first-3-d-printed-objects-connect-to-wifi-without-electronics/).

Sensirion Innovations Team, "Labs Idea #3: Intrusion / Open and Close Door Event Detection," Sensirion, Nov. 2017 (https://developer.sensirion.com/labs/intrusion-open-and-close-door-event-detection/).

Patel, Shwetak & Reynolds, Matthew & Abowd, Gregory. (2008). Detecting Human Movement by Differential Air Pressure Sensing in HVAC System Ductwork: An Exploration in Infrastructure Mediated Sensing. 1-18. 10.1007/978-3-540-79576-6_1.

* cited by examiner

Airflow Alert 102

Airflow Exit 202

Airflow Alert 102

Intruder 204

Airflow Exit 202

ANOMALY DETECTION BASED ON AIRFLOW ALERTERS

TECHNICAL FIELD

The present application generally relates to anomaly detection, and more particularly, to anomaly detection based on airflow measurement by a plurality of airflow alerters.

BACKGROUND

A data center is a dedicated facility that supports business-critical information technology (IT) servers. The heating, ventilation, and air conditioning (HVAC) system is one of the main components of the data center. The HVAC airflow must always stay on and provide continuous cooling to keep the IT servers in a running order.

However, in case of a disaster or emergency (e.g., power outage), other systems may stay off to save energy for the critical systems, which means that some security mechanisms like cameras and sensors may remain off during the disaster or emergency. Thus, a security system for anomaly (e.g., intrusion, component malfunction, etc.) detection is needed to maintain physical security controls in case of a disaster or emergency.

SUMMARY

Embodiments provide a computer-implemented method for anomaly detection in a data processing system comprising a processor and a memory comprising instructions which are executed by the processor, the method comprising: receiving, by the processor, a plurality of real-time airflow patterns acquired by a plurality of airflow alerters, wherein each real-time airflow pattern is generated by a heating, ventilation, and air conditioning (HVAC) system in a particular facility, and each real-time airflow pattern corresponds to a different airflow alerter; comparing, by the processor, each real-time airflow pattern with a predetermined airflow pattern, wherein each real-time airflow pattern corresponds to a different predetermined airflow pattern; when there is any real-time airflow pattern different from the corresponding predetermined airflow pattern, identifying, by the processor, a group of airflow alerters among the plurality of airflow alerters, wherein a real-time airflow pattern of each airflow alerter in the group is different from the corresponding predetermined airflow pattern; and identifying, by the processor, a location of an anomaly based on the group of airflow alerters.

Embodiments provide a computer-implemented method for anomaly detection, further comprising: receiving, by the processor, an alert message indicating the anomaly from each airflow alerter in the group; redirecting, by the processor, the alert message to a security information and event management (SIEM) system for a further analysis; and issuing, by the processor, an alert to a user.

Embodiments provide a computer-implemented method for anomaly detection, further comprising: when an real-time airflow pattern of a particular airflow alerter is the same as the corresponding predetermined airflow pattern, receiving, by the processor, a heartbeat message from the particular airflow alerter.

Embodiments provide a computer-implemented method for anomaly detection, wherein each airflow alerter is an anemometer.

Embodiments provide a computer-implemented method for anomaly detection, wherein the anemometer further includes one or more conductive ends and a battery, wherein the battery is charged by a wind power generated by the one or more conductive ends.

Embodiments provide a computer-implemented method for anomaly detection, wherein the anomaly is an intrusion of an intruder or a malfunction of the HVAC system.

Embodiments provide a computer-implemented method for anomaly detection, wherein the location of the anomaly is identified based on a location of each airflow alerter in the group through a triangulation technique.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a full question generation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
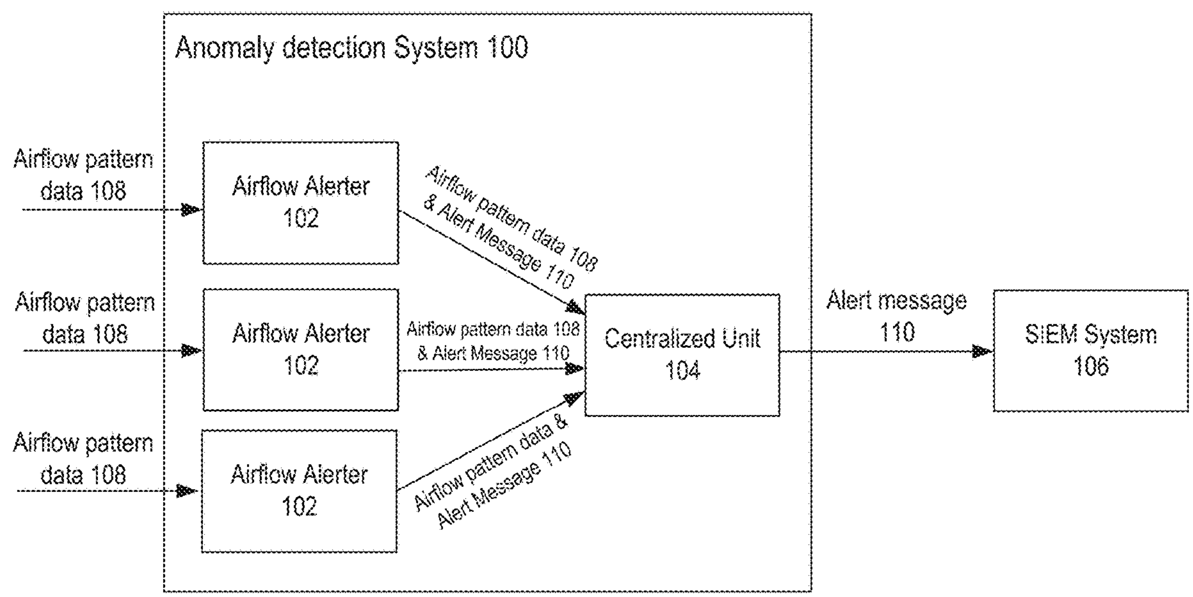
FIG. 1 depicts a schematic diagram of one illustrative embodiment of the anomaly detection system 100, according to embodiments described herein.

The present invention may be a system, a method, and/or a computer program product for performing anomaly detection. The computer program product may include a computer-readable storage medium (or media) having computer-readable program instructions thereon for causing a processor to carry out aspects of the present invention.

The system, method, and/or computer program product for anomaly detection can use a plurality of airflow alerters, e.g., anemometers, to acquire airflow patterns from different locations of a facility. If there is any airflow pattern at a location different from the regular airflow pattern or a predefined airflow pattern at that location, then a user or an administrator of the anomaly detection system can be alerted to a potential anomaly, e.g., illegal intrusion, or malfunction of a particular component of the HVAC system. In an example, an alert can be triggered if there is any airflow change detected by any of the airflow alerters. In another example, if any of the airflow alerters fails to report its status (i.e., failing to send any airflow pattern data) for a predetermined period, then an alert can be triggered.

In an embodiment, the plurality of airflow alerters can be integrated with heating, ventilation, and air conditioning (HVAC) system to detect the airflow. In another embodiment, the plurality of airflow alerters can be separate from the HVAC system.

In an embodiment, the anomaly detection system can have a plurality of regular airflow patterns with respect to time. The airflow may vary depending on the time. For example, the airflow could be higher during the day and lower at night due to ambient temperature changes. Accordingly, the anomaly detection system can have two regular airflow patterns, one for the day time and one for the night time.

In an embodiment, the anomaly detection system can use low power technologies like Long Range (LoRa®) or Sigfox™ to communicate the data between the plurality of airflow alerters and a centralized unit. LoRa® (Long Range) is a low-power wide-area network (LPWAN) technology. LoRa® enables long-range transmissions (more than 10 km in rural areas) with low power consumption. Sigfox™ is a wireless network technology to connect low-power objects that need to be continuously on and emit small amounts of data. The anomaly detection system utilizes messaging over low-power near-field communication protocols, such as DASH7 Alliance Protocol (D7A), LoRaWAN®, etc.

The centralized unit receives all the airflow pattern data from the plurality of airflow alerters in real time. If the difference between any received airflow pattern and the corresponding regular airflow pattern is greater than a predetermined threshold, e.g., 20%, then the centralized unit can receive an alert message from the corresponding airflow alerter or receive a plurality of alert messages from the corresponding group of airflow alerters. The threshold can result from reasonable ambient air changes due to, e.g., weather changes. If the difference is greater than the predetermined threshold, then there is an intrusion of an intruder or malfunction of an HVAC component.

The plurality of flow alerters can improve accuracy in contrast with a single anemometer. The plurality of flow alerters can be divided into a plurality of groups or clusters of flow alerters. For example, each row of a data center has a group of flow alerters including at least two flow alerters. The location of the threat or intrusion can be accurately identified by a nearby group of flow alerters, e.g., using triangulation techniques. Further, a map of an intruder's movements around the data center can be generated by identifying several groups of affected flow alerters. All of the flow alerters can be arranged to form a physical topology symmetric with a conventional HVAC topology for the physical facility.

In an example, an intruder gets into a physical facility accommodating a data center, the intruder will cause a change in the airflow. A group of flow alerters near the intruder can identify the change on the airflow and notify the centralized unit (e.g., sending an alert message). The centralized unit will then gather information (e.g., location of each flow alerter in this group) from this group of the flow alerters to triangulate the location of the intruder, or the route of the intruder, and execute the predetermined alert (e.g., a sound alert, a flashing alert, an alerting email sent to the user, an alerting message sent to the user, etc.).

In another example, one of the airflow exits fails to work, e.g., due to a malfunction of a HVAC component. A group of flow alerters near the airflow exit can identify a change on the airflow and notify the centralized unit. The centralized unit will then gather information (e.g., location of each flow alerter in this group) from the group of flow alerters to determine the location of the intrusion and execute an alert. In an embodiment, the centralized unit continuously gathers airflow pattern data from all of the flow alerters, so that the centralized unit can immediately identify the airflow change detected by any group of flow alerters near the failed airflow exit.

The conventional HVAC topology is generally based on an optimal comfort index using a predicted mean vote (PMV) model of the intelligent HVAC control and monitoring points. In an embodiment, all of the flow alerters can work as an intrusion detection node set, which is a form of HVAC monitoring point. Thus, similarly to the algorithm used for the conventional HVAC topology, an arrangement of the intrusion detection node set defines a propagation path to detect a temperature change to meet the PMV index. In this way, the placement of the intrusion detection node set can be realized by using straightforward telemetric measurements over the facility fabric (i.e., physical space of the facility and its HVAC coverage) and measurement of temperature change propagation. The placement of the intrusion detection node set can reflect the layout of the HVAC system, accounting for physical blockages that might impede detection of airflow (e.g., concrete load-bearing columns in the facility). The placement of the intrusion detection node set is expected to have as close to 100% coverage of the facility under observation. Each flow alerter is positioned strategically in the data center to provide the best coverage in terms of range and accuracy.

In an embodiment, the anomaly detection system is an autonomous system that uses a plurality of flow alerters (e.g., anemometers) to acquire airflow pattern data. The centralized unit can aggregate airflow pattern data acquired by all the flow alerters, and thus identify a flow alerter or a group of flow alerters that detects airflow change. The identified flow alerter or the identified group of flow alerters can be used to determine the location of an intruder, e.g., by triangulation techniques. Each flow alerter or each group of flow alerters can have a different regular air flow pattern, due to different location of each flow alerter or each group of flow alerters relative to the HVAC system. Each flow alerter or each group of flow alerters may have a plurality of regular air flow patterns within different time periods. Each flow alerter compares the real-time air flow pattern against a regular pattern for this flow alerter to detect a deviation, and generates an alert message in case of a deviation from the regular pattern.

The anomaly detection system can be used for HVAC monitoring in a data center or other temperature-critical environments. The anomaly detection system can detect airflow change well in advance of any temperature sensor reaching a threshold, and thus allowing emergency remediation at an earlier stage. The anomaly detection system can be used for bank surveillance, vault surveillance, data center surveillance, and any system that requires physical security.

FIG. 1 depicts a schematic diagram of one illustrative embodiment of the anomaly detection system 100, according to embodiments described herein. In an embodiment, the anomaly detection system 100 includes a plurality of airflow alerters 102 (e.g., three airflow alerters 102) and a centralized unit 104. Each airflow alerter 102 is configured to detect airflow data 108 in a physical facility equipped with a HVAC system, e.g., a data center, a residential house, a bank, etc.

Figure 2A:
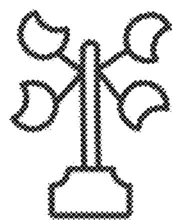
FIG. 2A depicts an exemplary regular airflow without an intruder, according to embodiments described herein.
Figure 2A:
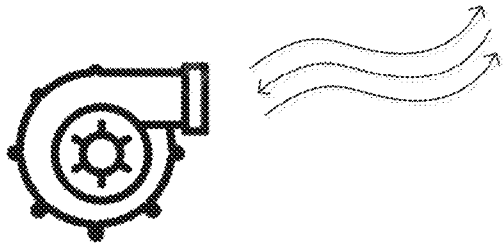
Figure 2B:
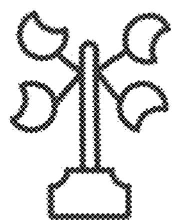
FIG. 2B depicts an exemplary abnormal airflow with an intruder, according to embodiments described herein.
Figure 3A:
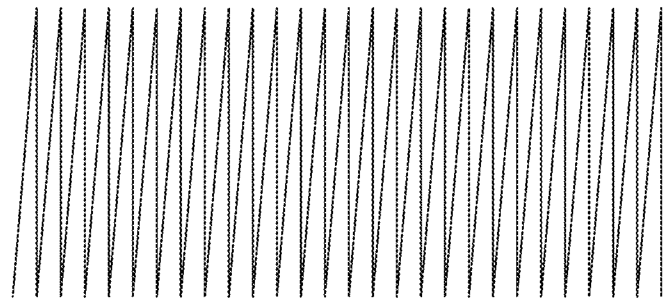
FIG. 3A depicts an exemplary regular airflow pattern, according to embodiments described herein.
Figure 3B:
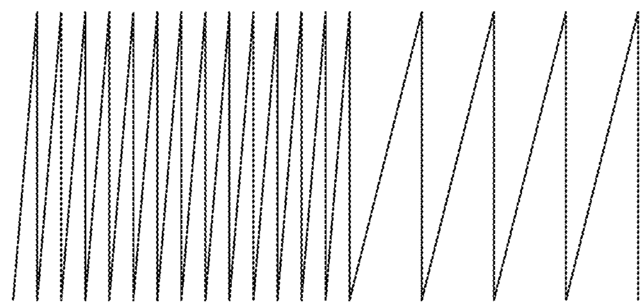
FIG. 3B depicts an exemplary abnormal airflow pattern, according to embodiments described herein.

The centralized unit 104 can receive the airflow pattern data 108 in real time from the plurality of airflow alerters 102. All the flow alerters 102 feed airflow data to the centralized unit 104. Each flow alerter 102 is configured to compare the real-time airflow pattern with a regular airflow pattern or a predetermined airflow pattern. Each flow alerter 102 can have its own regular airflow pattern or predetermined airflow pattern, depending on its location relative to the HVAC system. If the real-time airflow pattern is different from the regular airflow pattern or the predetermined airflow pattern, then this flow alerter 102 can generate an alert message 110 regarding a possible intrusion. FIG. 2A depicts an exemplary regular airflow without an intruder, according to embodiments described herein. If there is no intruder 204, an exemplary regular airflow pattern can be shown in FIG. 3A. FIG. 2B depicts an exemplary abnormal airflow with an intruder 204, according to embodiments described herein. If there is an intruder 204 blocking the airflow exit 202, there is a change in the airflow pattern. An exemplary abnormal airflow pattern, due to an intrusion, can be shown in FIG. 3B.

In an embodiment, the centralized unit 104 can directly alert an administrator to the intrusion. In another embodiment, the centralized unit 104 can redirect the alert message 110 to another local or remote receiver, e.g., a security information and event management (SIEM) system 106 (such as IBM® QRadar®). For example, the alert message 110 can be redirected to an event collector of IBM® QRadar® for further analysis through an event redirection protocol (e.g., syslog). IBM® QRadar® is an enterprise security information and event management (SIEM) product. It collects log data from an enterprise, its network devices, host assets and operating systems, applications, vulnerabilities, and user activities and behaviors. IBM® QRadar® then performs real-time analysis of the log data and network flows to identify malicious activity, so that it can be stopped quickly, preventing or minimizing damage to the enterprise.

In an embodiment, the alert message 110 is a syslog message. As shown in Table 1 below, the syslog message may include a facility code, severity level, a message tag, and message content. In an example, the facility code for security-related message is "13." When the severity level is "1," then it indicates that a possible intrusion (e.g., due to an intruder 204) or air loss (e.g., due to malfunction of HVAC system) is detected; while when the severity level is "6," then it indicates that this syslog message is a heartbeat message indicating that the airflow alerter 102 is in regular operation. The message tag indicates that this syslog message is related to an airflow alerter 102. The message content shows specific content of this syslog message.

TABLE 1

| Syslog message format | | |
|---|---|---|
| Protocol Element | Value/Usage | Notes |
| Facility Code | 13 (Security) | |
| Severity Level | 1 (Alert)<br>6 (Informational) | Alert: Intrusion detected or presumed, or airflow loss<br>Informational: Heartbeat message |
| Message: Tag/AppName | "Airflow Alerter" | |
| Message: Content | "Airflow loss, possible intrusion"<br>"Airflow Alerter Operational" | |

In an embodiment, each airflow alerter 102 can be an anemometer that is used to measure the speed and direction of the airflow. In an embodiment, the centralized unit 104 can execute an alert if any airflow alerter 102 detects any airflow change. In another embodiment, the centralized unit 104 can execute an alert when the difference between any real-time airflow pattern and the corresponding regular airflow pattern is higher than a predetermined threshold (e.g., 30%), in order to reduce the number of false positives.

Figure 4:
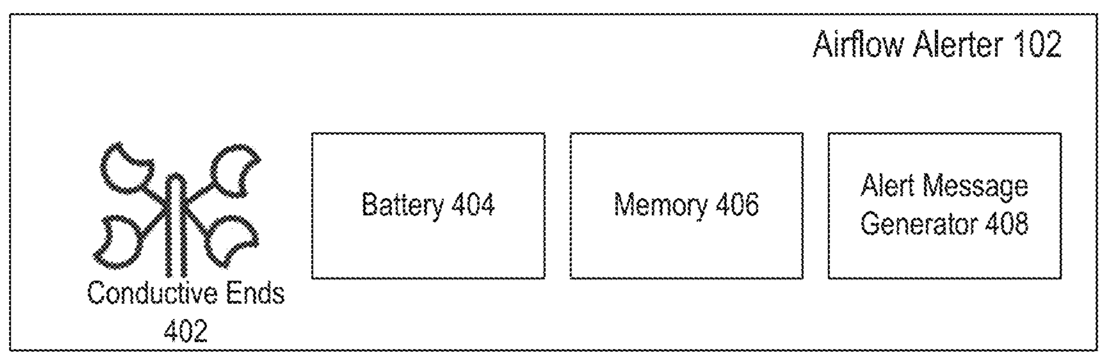
FIG. 4 depicts a schematic diagram of one illustrative embodiment of an airflow alerter 102, according to embodiments described herein.

FIG. 4 depicts a schematic diagram of one illustrative embodiment of an airflow alerter 102, according to embodiments described herein. As shown in FIG. 4, each airflow alerter 102 includes one or more conductive ends 402, battery 404, and memory 406.

The one or more conductive ends 402 are configured to collect wind data (i.e., airflow from the HVAC system), such as speed or angle of the wind. If the angle or speed of the wind changes, the airflow will also change, indicating that the airflow is blocked, e.g., due to an intrusion. The wind power can be used to charge an internal battery 404 of each airflow alerter 102, to keep each airflow alerter 102 running autonomously even in case of a power outage. In an example, the retained power in the internal battery 404 needs to be sufficient for triggering an alert, e.g., the retained power needs to be sufficient to yield a power of 2.5 watts at 1.2 volts (2.0 amps). As each airflow alerter 102 stays connected and charged through its own wind power recycle, each airflow alerter 102 becomes its own self-monitoring Internet-of-Things (IoT) node through its continuous duty cycle.

In an embodiment, each airflow alerter 102 is an embedded hardware/software system. The battery 404 is charged with an electric power continuously converted from the wind power. The battery 404 power accrues while the conductive ends 402 rotate to measure the airflow. In an example, the battery 404 power is at least 2.7-3.2 volts, so that it can enable the 32 MB flash memory to refresh over a period of alerting cycle (e.g., three minutes).

The memory 406 is configured to store one or more regular airflow patterns and a configuration file. In an embodiment, the memory 406 can be a 32 MB flash memory. The current airflow pattern is measured by the one or more conductive ends 402 in real time. The current airflow pattern can be compared with the corresponding regular airflow pattern to determine whether there is any change in the airflow pattern. In an embodiment, one airflow alerter 102 can have three regular airflow patterns, i.e., one for morning, one for afternoon, and one for night, respectively.

The configuration file is used to configure a protocol (e.g., Internet Protocol version 4) and a network (e.g., 802.11 link)

for transmitting an alert message, and a duration of alert message transmission (e.g., 60 seconds). In an embodiment, the configuration file can be in a JavaScript Object Notation (JSON) format.

The alert message generator 408 is configured to generate an alert message if the real-time airflow pattern is different from the corresponding regular airflow pattern. In an embodiment, the alert message can be generated when the difference between the real-time airflow pattern and the regular airflow pattern is higher than a predetermined threshold (e.g., 20%), in order to reduce the number of false positives.

Figure 5:
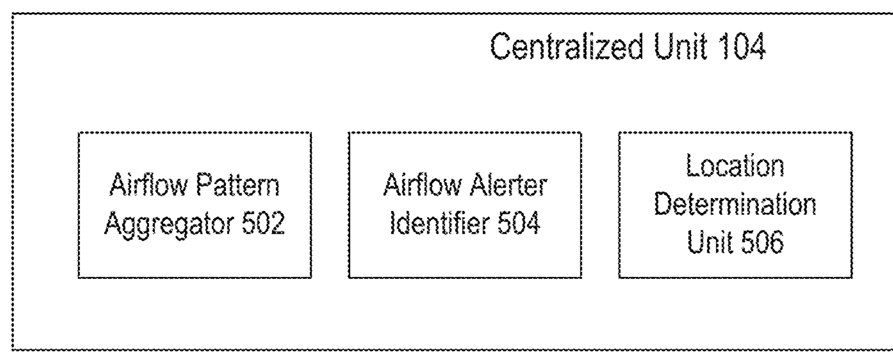
FIG. 5 depicts a schematic diagram of one illustrative embodiment of the centralized unit 104, according to embodiments described herein.

FIG. 5 depicts a schematic diagram of one illustrative embodiment of the centralized unit 104, according to embodiments described herein. As shown in FIG. 5, the centralized unit 104 includes airflow pattern collector 502, airflow alerter identifier 504, and location determination unit 506. The airflow pattern aggregator 502 is configured to aggregate the real-time airflow data acquired by all the airflow alerters 102. The airflow alerter identifier 504 is configured to identify an airflow alerter 102 or a group of airflow alerters 102 that detects an airflow change. Each airflow alerter 102 continuously acquires airflow pattern data at its designated location and sends the airflow pattern data to the airflow pattern aggregator 502. For each airflow alerter 102, if the real-time airflow pattern is the same as the regular airflow pattern or the predetermined airflow pattern, then there is no intrusion or HVAC component malfunction. In an example, if a particular airflow alerter 102 detects that the real-time airflow pattern is different from the regular airflow pattern or the predetermined airflow pattern (i.e., there is a change on the airflow pattern), then this particular airflow alerter 102 will generate an alert message indicating an anomaly (e.g., intrusion or HVAC component malfunction). In another example, if a particular group of airflow alerters 102 detects that the real-time airflow pattern is different from the regular airflow pattern or the predetermined airflow pattern, then each airflow alerter 102 in this particular group will generate an alert message indicating an anomaly. In an embodiment, the alert message can be generated when the difference between the real-time airflow pattern and the regular airflow pattern is higher than a predetermined threshold (e.g., 20%), in order to reduce the number of false positives.

Figure 6:
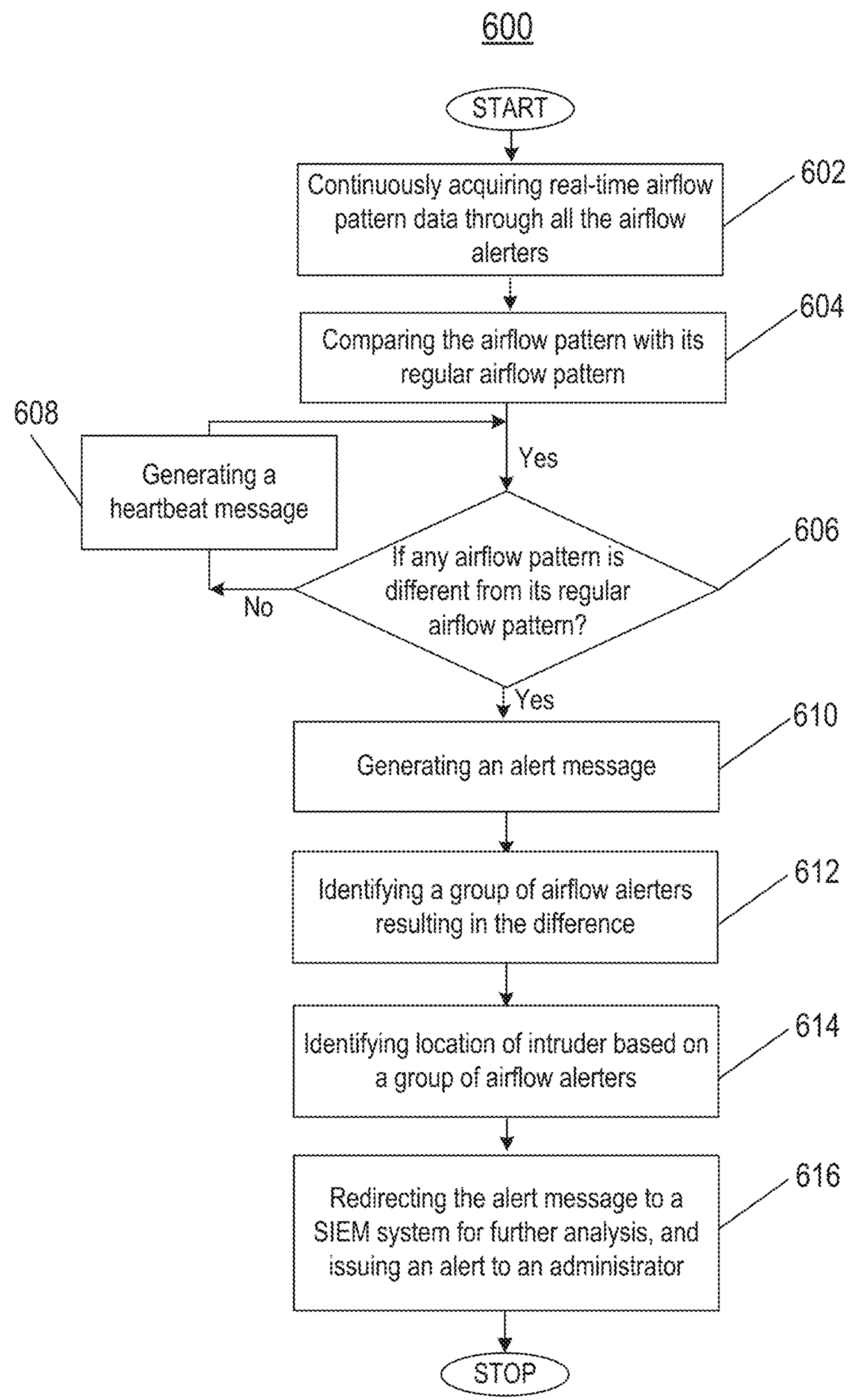
FIG. 6 depicts a flow chart of an exemplary method 600 of detecting an anomaly based on airflow measurement, according to embodiments described herein.

FIG. 6 depicts a flow chart of an exemplary method 600 of detecting an anomaly based on airflow measurement, according to embodiments described herein. At step 602, all the airflow alerters are continuously acquiring real-time airflow pattern data. In an embodiment, one or more conductive ends of each airflow alerter continuously rotate to measure the airflow data.

At step 604, for each airflow alerter, the real-time airflow pattern is compared with a regular airflow pattern (i.e., normal airflow pattern without any intrusion or HVAC component malfunction) or a predetermined airflow pattern. In an embodiment, the regular airflow pattern can be different with respect to time, i.e., the regular airflow pattern may vary depending on the time. For example, due to ambient temperature changes, there are two regular airflow patterns, one for the day time and one for the night time. For another example, there is a plurality of regular airflow patterns corresponding to different time periods of a day.

At step 606, if the real-time airflow pattern is different from the regular airflow pattern or the predetermined airflow pattern, then at step 610, the corresponding airflow alerter can generate an alert message.

At step 612, a group of airflow alerters detecting an airflow change are identified. Among all the airflow alerters, a group of airflow alerters nearby an intrusion or a component malfunction can detect a change on the airflow, while the remaining airflow alerters acquire unchanged airflow pattern data.

At step 614, a location of an intruder or a malfunctioning component can be identified based on the group of airflow alerters near the intruder or a malfunctioning component. The location of the threat or intrusion can be accurately identified based on a location of each flow alerter in the group of flow alerters, e.g., using triangulation techniques. Triangulation is a process of determining the location of a point by measuring only angles to it from known points at either end of a fixed baseline.

If the real-time airflow pattern is the same as the regular airflow pattern or the predetermined airflow pattern, then at step 608, a heartbeat message, indicating that there is no anomaly, is generated.

At step 616, each alert message is redirected to a SIEM system for further analysis, and an alert is issued to an administrator. In an embodiment, the location of the intruder or the malfunctioning component can also be sent to the SIEM system, together with the alert message.

Figure 7:
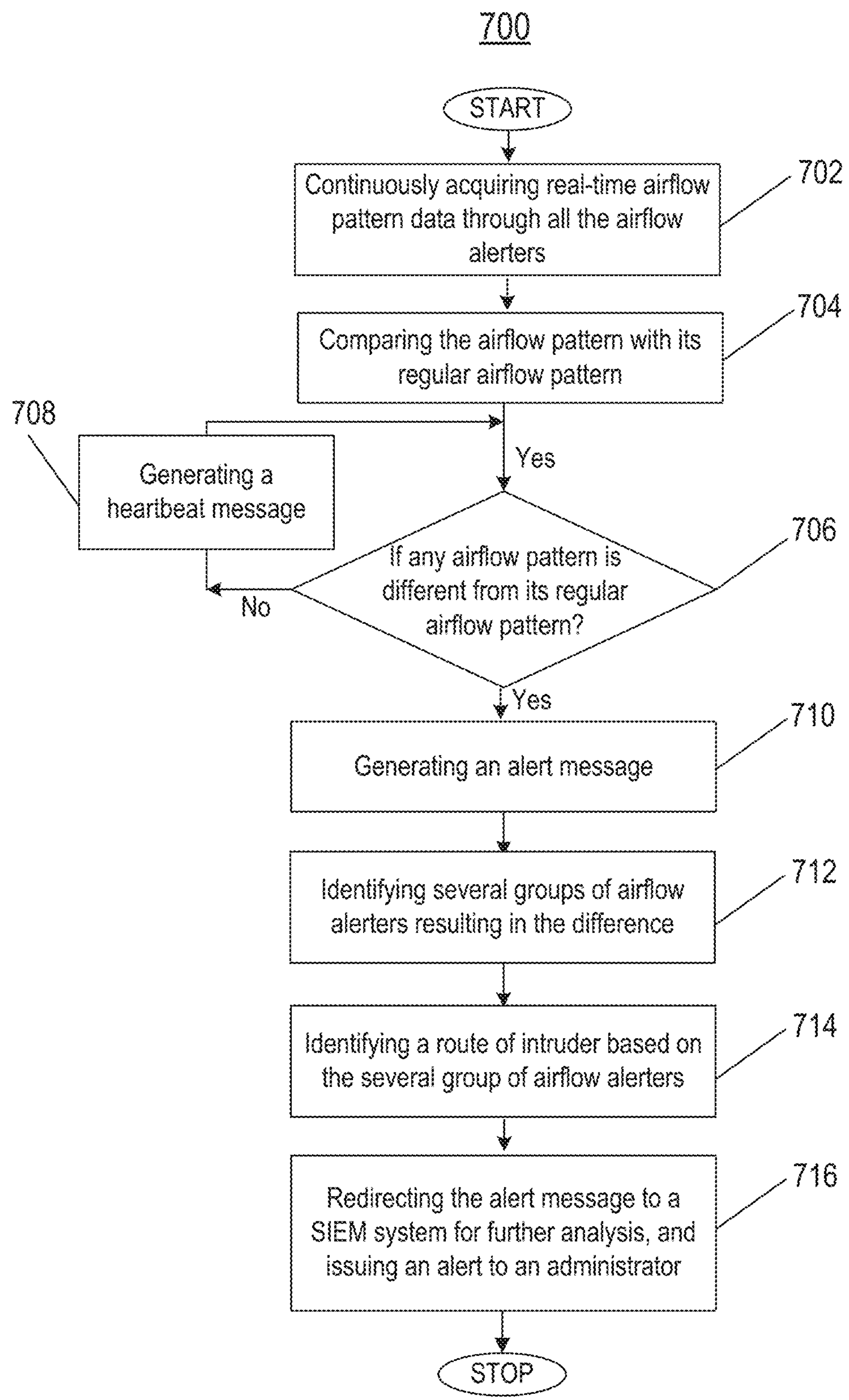
FIG. 7 depicts a flow chart of another exemplary method 700 of detecting an anomaly based on airflow measurement, according to embodiments described herein.

FIG. 7 depicts a flow chart of another exemplary method 700 of detecting an anomaly based on airflow measurement, according to embodiments described herein. Steps 702-712 are the same as steps 602-612. At step 712, several groups of airflow alerters detecting an airflow change are identified. As an intruder moves, several groups of airflow alerters along a route of the intruder are impacted and can detect a change on the airflow.

At step 714, a route of an intruder can be identified by the impacted several groups of airflow alerters. Each group of airflow alerters can identify one position on the route. In an embodiment, each position can be accurately identified by the corresponding group of flow alerters, e.g., using triangulation techniques.

At step 716, similarly to the step 616, each alert message, as well as the route of the intruder, is redirected to a SIEM system for further analysis, and an alert is issued to an administrator.

In an example, a malicious intruder disconnects a web camera used to guard the hall to the CEO office, having the intent of stealing confidential information, without triggering an alert or leaving a record. When the intruder walks into the protected area (the CEO office), the anomaly detection system will detect interruption of the airflow due to the physical movement of the intruder. Accordingly, the anomaly detection system will trigger an alert and other linked security reconciliation actions (e.g., locking the building from the inside, so that the intruder in locked in the building).

In another example, in a data center, the physical security has to be performed through devices that are continuously powered, e.g., an electronically powered lock or a surveillance camera. If a power failure is initiated by a malicious intruder, the intruder can make physical access to enterprise assets in the data center through breakage and intrusion into the physical space (e.g., creating a hole in the floor or ceiling). Generally, in the data center, the HVAC system generating the airflow is powered by backup uninterruptable power supply (UPS) in case of the power failure. For example, if the UPS device fails to work or HVAC system fails to work, then the anomaly detection system including a plurality of airflow alerters can detect that there is no air flow. Accordingly, it will trigger an alert. For another example, presence of the intruder leads to an interruption of the air flow. Accordingly, it will trigger an alert.

In another example, an intruder breaks a plurality of lights to avoid being detected. Then he tries to sneak in through ventilation ducts to get access to the building. Thus, the plurality of airflow alerters will detect a change on the pattern of the airflow, and then trigger a plurality of security measures (e.g., execute a loud alert, execute a blinding light, etc.).

Figure 8:
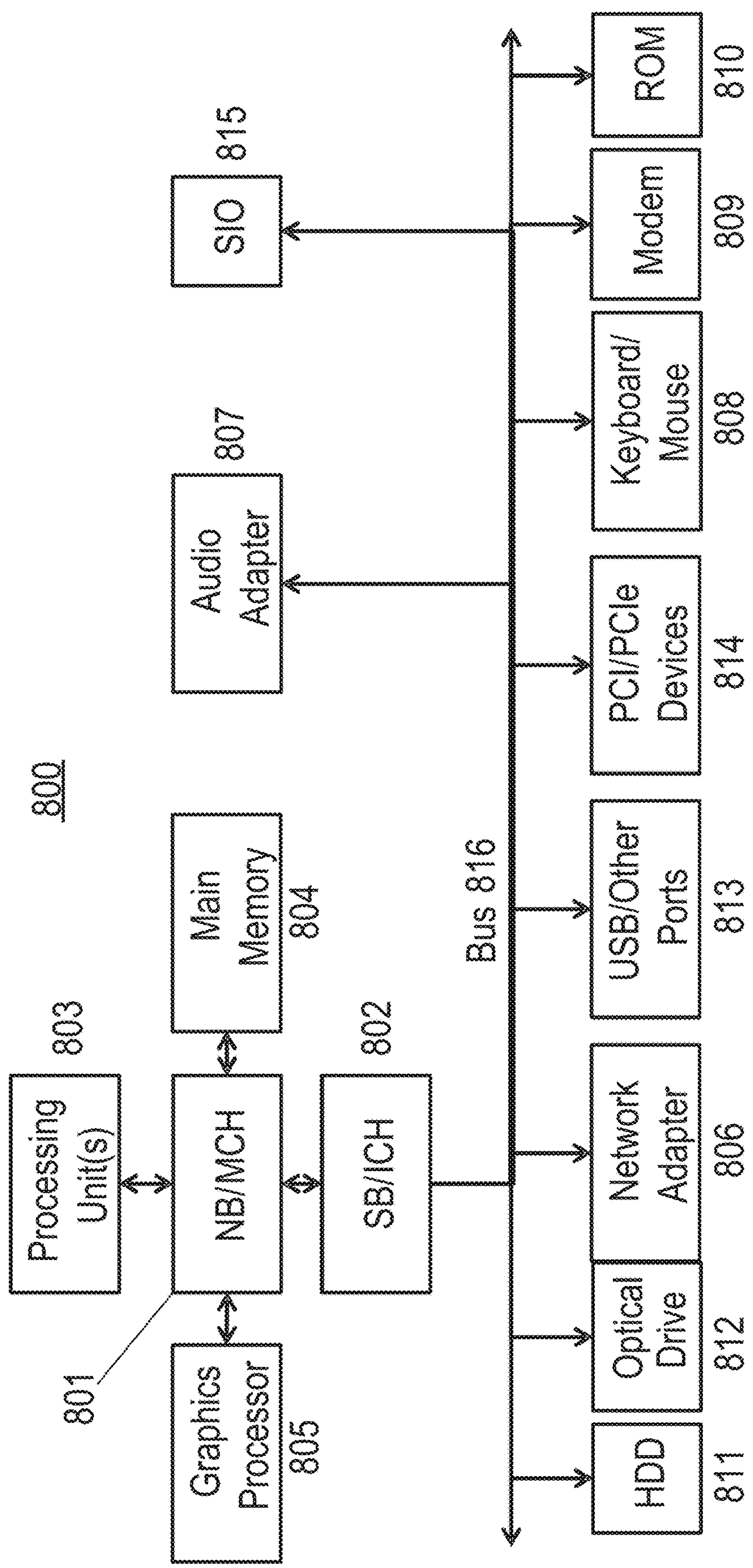
FIG. 8 is a block diagram of an example data processing system 800 in which aspects of the illustrative embodiments are implemented.

FIG. 8 is a block diagram of an example data processing system 800 in which aspects of the illustrative embodiments are implemented. Data processing system 800 is an example of a computer, such as a server or a client, in which computer usable code or instructions implementing the process for illustrative embodiments of the present invention are located. In one embodiment, FIG. 8 represents a server computing device, such as a server, which implements the anomaly detection system 100 described herein.

In the depicted example, the data processing system 800 can employ a hub architecture including a north bridge and memory controller hub (NB/MCH) 801 and south bridge and input/output (I/O) controller hub (SB/ICH) 802. Processing unit 803, main memory 804, and graphics processor 805 can be connected to the NB/MCH 801. Graphics processor 805 can be connected to the NB/MCH 801 through an accelerated graphics port (AGP).

In the depicted example, the network adapter 806 connects to the SB/ICH 802. The audio adapter 807, keyboard and mouse adapter 808, modem 809, read-only memory (ROM) 810, hard disk drive (HDD) 811, optical drive (CD or DVD) 812, universal serial bus (USB) ports and other communication ports 813, and the PCI/PCIe devices 814 can connect to the SB/ICH 802 through bus system 816. PCI/PCIe devices 814 may include Ethernet adapters, add-in cards, and PC cards for notebook computers. ROM 810 may be, for example, a flash basic input/output system (BIOS). The HDD 811 and optical drive 812 can use an integrated drive electronics (IDE) or serial advanced technology attachment (SATA) interface. The super I/O (SIO) device 815 can be connected to the SB/ICH.

An operating system can run on processing unit 803. The operating system can coordinate and provide control of various components within the data processing system 800. As a client, the operating system can be a commercially available operating system. An object-oriented programming system, such as the Java™ programming system, may run in conjunction with the operating system and provide calls to the operating system from the object-oriented programs or applications executing on the data processing system 800. As a server, the data processing system 800 can be an IBM® eServer™ System p running the Advanced Interactive Executive operating system or the Linux operating system. The data processing system 800 can be a symmetric multiprocessor (SMP) system that can include a plurality of processors in the processing unit 803. Alternatively, a single processor system may be employed.

Instructions for the operating system, the object-oriented programming system, and applications or programs are located on storage devices, such as the HDD 811, and are loaded into the main memory 804 for execution by the processing unit 803. The processes for embodiments of the full question generation system can be performed by the processing unit 803 using computer usable program code, which can be located in a memory such as, for example, main memory 804, ROM 810, or in one or more peripheral devices.

A bus system 816 can be comprised of one or more busses. The bus system 816 can be implemented using any type of communication fabric or architecture that can provide for a transfer of data between different components or devices attached to the fabric or architecture. A communication unit such as the modem 809 or network adapter 806 can include one or more devices that can be used to transmit and receive data.

Those of ordinary skill in the art will appreciate that the hardware depicted in FIG. 8 may vary depending on the implementation. For example, the data processing system 800 includes several components which would not be directly included in some embodiments of the anomaly detection system 100. However, it should be understood that the anomaly detection system 100 may include one or more of the components and configurations of the data processing system 800 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data processing system 800 can take the form of any of a number of different data processing systems, including but not limited to, client computing devices, server computing devices, tablet computers, laptop computers, telephone or other communication devices, personal digital assistants, and the like. Essentially, data processing system 800 can be any known or later developed data processing system without architectural limitation.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for anomaly detection in a data processing system comprising a processor and a memory comprising instructions which are executed by the processor, the method comprising:

receiving, by the processor, a plurality of real-time airflow patterns acquired by a plurality of airflow alerters, wherein each real-time airflow pattern is generated by a heating, ventilation, and air conditioning (HVAC) system in a particular facility, and each real-time airflow pattern corresponds to a different airflow alerter;

comparing, by the processor, each real-time airflow pattern with a predetermined airflow pattern, wherein each real-time airflow pattern corresponds to a different predetermined airflow pattern;

when there is any real-time airflow pattern different from the corresponding predetermined airflow pattern, identifying, by the processor, a group of airflow alerters among the plurality of airflow alerters, wherein a real-time airflow pattern of each airflow alerter in the group is different from the corresponding predetermined airflow pattern; and identifying, by the processor, a location of an anomaly based on the group of airflow alerters.

2. The method of claim 1, further comprising:

receiving, by the processor, an alert message indicating the anomaly from each airflow alerter in the group;

redirecting, by the processor, the alert message to a security information and event management (SIEM) system for a further analysis; and issuing, by the processor, an alert to a user.

3. The method of claim 1, further comprising:

when an real-time airflow pattern of a particular airflow alerter is the same as the corresponding predetermined airflow pattern, receiving, by the processor, a heartbeat message from the particular airflow alerter.

4. The method of claim 1, wherein each airflow alerter is an anemometer.

5. The method of claim 4, wherein the anemometer further includes one or more conductive ends and a battery, wherein the battery is charged by a wind power generated by the one or more conductive ends.

6. The method of claim 1, wherein the anomaly is an intrusion of an intruder or a malfunction of the HVAC system.

7. The method of claim 1, wherein the location of the anomaly is identified based on a location of each airflow alerter in the group through a triangulation technique.

8. A computer program product for intrusion detection, the computer program product comprising a computer readable storage medium having program instructions embodied therewith, the program instructions executable by a processor to cause the processor to:

receive a plurality of real-time airflow patterns acquired by a plurality of airflow alerters, wherein each real-time airflow pattern is generated by a heating, ventilation, and air conditioning (HVAC) system in a particular facility, and each real-time airflow pattern corresponds to a different airflow alerter;

compare each real-time airflow pattern with a predetermined airflow pattern, wherein each real-time airflow pattern corresponds to a different predetermined airflow pattern;

when there is any real-time airflow pattern different from the corresponding predetermined airflow pattern, identify a plurality of groups of airflow alerters among the plurality of airflow alerters, wherein a real-time airflow pattern of each airflow alerter in the plurality of groups is different from the corresponding predetermined airflow pattern; and identify a route of an intrusion based on the plurality of groups of airflow alerters.

9. The computer program product as recited in claim 8, wherein the processor is further caused to receive an alert message indicating the anomaly from each airflow alerter in the plurality of groups;

redirect the alert message to a security information and event management (SIEM) system for a further analysis; and issue an alert to a user.

10. The computer program product as recited in claim 8, wherein the processor is further caused to when an real-time airflow pattern of a particular airflow alerter is the same as the corresponding predetermined airflow pattern, receive a heartbeat message from the particular airflow alerter.

11. The computer program product as recited in claim 8, wherein each airflow alerter is an anemometer.

12. The computer program product as recited in claim 11, wherein the anemometer further includes one or more conductive ends and a battery, wherein the battery is charged by a wind power generated by the one or more conductive ends.

13. The computer program product as recited in claim 8, wherein the step of identifying a route of an intrusion further causes the processor to identify a different location of the intrusion based on each group of airflow alerters; and connecting all the locations of the intrusion to form a route.

14. The computer program product as recited in claim 13, wherein each location of the intrusion is identified based on a location of each airflow alerter in the corresponding group through a triangulation technique.

15. A system for intrusion detection, comprising:

a processor configured to:

receive a plurality of real-time airflow patterns acquired by a plurality of airflow alerters, wherein each real-time airflow pattern is generated by a heating, ventilation, and air conditioning (HVAC) system in a particular facility, and each real-time airflow pattern corresponds to a different airflow alerter;

compare each real-time airflow pattern with a predetermined airflow pattern, wherein each real-time airflow pattern corresponds to a different predetermined airflow pattern;

when there is any real-time airflow pattern different from the corresponding predetermined airflow pattern, identify a plurality of groups of airflow alerters among the plurality of airflow alerters, wherein a real-time airflow pattern of each airflow alerter in the plurality of groups is different from the corresponding predetermined airflow pattern; and identify a route of an intrusion based on the plurality of groups of airflow alerters.

16. The system as recited in claim 15, wherein the processor is further configured to receive an alert message indicating the anomaly from each airflow alerter in the plurality of groups;

redirect the alert message to a security information and event management (SIEM) system for a further analysis; and issue an alert to a user.

17. The system as recited in claim 15, wherein the processor is further configured to when a real-time airflow pattern of a particular airflow alerter is the same as the corresponding predetermined airflow pattern, receive a heartbeat message from the particular airflow alerter.

18. The system as recited in claim 15, wherein each airflow alerter is an anemometer, wherein the anemometer further includes one or more conductive ends and a battery, wherein the battery is charged by a wind power generated by the one or more conductive ends.

19. The system as recited in claim 15, wherein the step of identifying a route of an intrusion further configure the processor to identify a different location of the intrusion based on each group of airflow alerters; and connecting all the locations of the intrusion to form a route.

20. The system as recited in claim 19, wherein each location of the intrusion is identified based on a location of each airflow alerter in the corresponding group through a triangulation technique.

* * * * *